(12) United States Patent
Nelson et al.

(10) Patent No.: US 7,892,125 B2
(45) Date of Patent: Feb. 22, 2011

(54) SIMPLIFIED AND ADAPTABLE FLEXIBLE DRIVE TENSIONER

(75) Inventors: Aaron T. Nelson, Wilsonville, OR (US); Ng Boon Hang, Singapore (SG); Alan Boo Keng Aik, Singapore (SG); Brent R. Jones, Wilsonville, OR (US)

(73) Assignee: Xerox Corporation, Norwalk, CT (US)

( * ) Notice: Subject to any disclaimer, the term of this patent is extended or adjusted under 35 U.S.C. 154(b) by 549 days.

(21) Appl. No.: 11/532,392

(22) Filed: Sep. 15, 2006

(65) Prior Publication Data

US 2008/0070730 A1    Mar. 20, 2008

(51) Int. Cl.
 *F16H 7/12* (2006.01)
 *F16H 7/08* (2006.01)
 *F16H 7/22* (2006.01)
 *F16H 7/14* (2006.01)
 *F16H 7/18* (2006.01)

(52) U.S. Cl. ............... 474/134; 474/101; 474/111; 474/117; 474/118; 474/135; 474/140

(58) Field of Classification Search ............ 474/134, 474/111, 101, 140, 135, 117, 118
See application file for complete search history.

(56) References Cited

U.S. PATENT DOCUMENTS

| | | | | |
|---|---|---|---|---|
| 3,941,006 A | * | 3/1976 | Brodesser | 474/132 |
| 4,934,989 A | * | 6/1990 | Furukawa et al. | 474/135 |
| 5,221,236 A | * | 6/1993 | Raymer et al. | 474/109 |
| 6,083,132 A | * | 7/2000 | Walker | 474/111 |
| 6,117,034 A | * | 9/2000 | Vine | 474/134 |
| 6,648,783 B1 | * | 11/2003 | Bogner | 474/134 |
| 6,666,602 B2 | * | 12/2003 | Johnson | 400/624 |
| 6,689,001 B2 | * | 2/2004 | Oliver et al. | 474/134 |
| 6,742,685 B2 | * | 6/2004 | Williams | 224/197 |
| 6,743,131 B1 | * | 6/2004 | Walker | 474/134 |

* cited by examiner

*Primary Examiner*—Michael R Mansen
*Assistant Examiner*—Henry Liu
(74) *Attorney, Agent, or Firm*—Marger Johnson & McCollom, P.C.

(57) ABSTRACT

A device for tensioning a flexible drive member includes a pair of opposing contact elements adapted to simultaneously engage upper and lower spans of the flexible drive member. The device further includes a connecting member to draw the contact elements together and position the contact elements at a selected distance from each other to provide a predetermined tension to the flexible drive member. The tensioning device may be implemented in a print substrate transport subsystem adapted to move media through a print system.

19 Claims, 7 Drawing Sheets

SIMPLIFIED AND ADAPTABLE FLEXIBLE DRIVE TENSIONER

BACKGROUND

Belt, chain, and other flexible drive tensioners eliminate slack, noise, slip, and wear in all types of flexible drive systems employing belts, cables, chains, bands, timing belts, o-ring belts and so forth. Conventional implementations of belt tensioners typically rely on pivot arms, structural members, or housings that attach to at least one structural element of a device in which drive pulleys or gears are mounted. While capable of handling high torque transmissions and preload forces, these conventional implementations can be costly because they add complexity to the drive system and require additional space.

Conventional tensioner devices tend to be application-specific and complex. Typically, flexible drive tensioning solutions require the tensioner envelope and mounting provisions to be planned in as a particular design is developed. Smaller drive systems with relatively close spacing between sets of pulleys, gears, or timing pulleys often do not have room for mounting a tensioning system. Additionally, because of design evolution, application changes, or changes in availability of system components, many drive implementations that were originally configured without a tensioning device may later require the addition of a drive tensioner to operate optimally.

Thus, there is a need for a simplified, low cost means of supplying a tensioning function for a broad range of flexible drive systems without requiring substantial additional space or mounting provisions.

SUMMARY

In one embodiment, a device for tensioning a flexible drive member includes a pair of opposing contact elements adapted to simultaneously engage upper and lower spans of the flexible drive member. The device further includes a connecting member to draw the contact elements together and position the contact elements at a selected distance from each other to provide a predetermined tension to the flexible drive member.

In another embodiment, a print substrate transport subsystem adapted to move media through a print system comprises a carriage including a plurality of idler rollers disposed at positions opposite a plurality of corresponding drive rollers to form a nip between the idler and drive rollers. The system further includes a drive motor adapted to drive the plurality of drive rollers. The drive motor may be connected to the carriage via a flexible drive member looped over a pair of pulleys. In this embodiment, a tensioning device to provide tension to the flexible drive member comprises first and second contact elements adapted to simultaneously engage upper and lower spans of the flexible drive member. The tensioning device further comprises a connecting member to draw together and position the contact elements at a selected distance from each other to provide a predetermined tension to the flexible drive member.

In another embodiment, a method for tensioning a flexible drive member without mounting to a structure includes attaching the flexible drive member over opposing pulleys and simultaneously engaging upper and lower spans of the flexible drive member with a pair of opposing contact elements. The method further includes drawing the pair of opposing contact elements together with at least one connecting member and positioning the pair of opposing contact elements at a selected distance from each other.

DETAILED DESCRIPTION

FIGS. 1-12 show various embodiments of an unconstrained tensioner for providing tension to a flexible drive member of a drive mechanism without mounting the tensioner to a surrounding frame or structure of a system in which the drive mechanism is implemented. The flexible drive member may include a belt, chain, band, and wire. Hereinafter, the term "belt" may be used to refer to include any of these flexible drive members for simplicity. The basic elements of the disclosed tensioner are simple and low cost for non-critical drive systems but flexible enough to be configured for more demanding applications.

Figure 1:
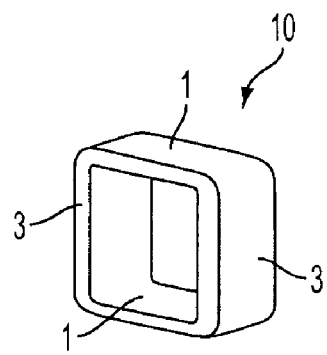
FIG. 1 shows one embodiment of a tensioner that "encircles" a belt.
Figure 2:
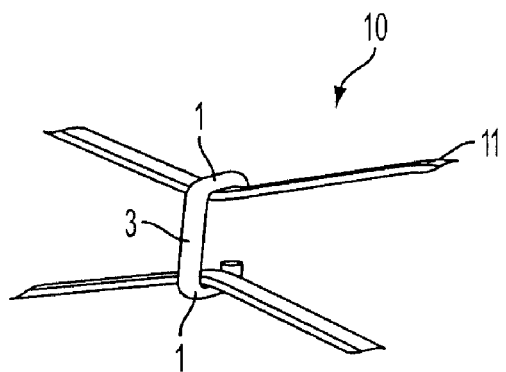
FIG. 2 shows another embodiment of a tensioner having a single spine.

FIGS. 1 and 2 show an unconstrained tensioner 10 in its simplest forms. In this embodiment, the tensioner 10 comprises a pair of opposing contact elements 1 adapted to simultaneously engage upper and lower spans of a flexible drive member 11 (FIG. 2). The contact elements 1 preferably have surfaces that allow the flexible drive member 11 to pass smoothly along the surfaces. At least one connecting member 3 is adapted to connect and draw the pair of contact elements 1 together such that the contact elements 1 are positioned at a selected distance from each other to apply a predetermined tension to the belt. The connecting member 3 may be sized and shaped for a given application. For example, as shown in FIG. 1, the connecting member 3 comprises two spines such that the tensioner 10 "encircles" the belt 11. In this configuration, the tensioner 10 may be installed by passing the belt 11 through the tensioner 10 prior to wrapping 11 the belt around one of the pulleys to which the belt is to be connected. In the embodiment of FIG. 2, the tensioner 10 may be configured such that the connecting member 3 comprises a single spine connecting corresponding first ends of the contact elements 1 and the spine may be disposed perpendicular to a path along which the belt 11 travels. With a single spine for the connecting member 3, the contact elements 1 may be configured such that their unconnected second ends are bent over the belt 11 to help prevent the tensioner 10 from slipping off the belt 11. In this configuration, the tensioner 10 may be installed over an assembled drive belt mechanism.

In the embodiments shown in FIGS. 1 and 2, the connecting member 3 comprises at least one rigid arm. The length of the rigid arm may be determined to position the contact elements 1 at a selected distance from each other corresponding to a predetermined tension and eliminates undesired slack in the belt 11. The simple configurations shown in FIGS. 1 and 2 may be suitable in applications which do not require tight tolerances in the belt length. In other embodiments, however, the connecting member 3 may be further configured to dynamically adjust the selected distance between the contact elements 1 to maintain a predetermined tension in the belt 11.

Figure 3:
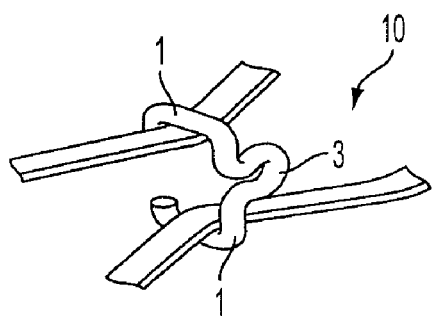
FIG. 3 shows another embodiment of a tensioner having a spring spine.

Referring now to FIG. 3, the connecting member 3 of the tensioner 10 may be configured in a "spring" form. In this embodiment, the connecting member 3 of the tensioner comprises a resilient or spring spine. The spring spine 3 may be curve-shaped to provide its resilient characteristic. In this configuration, the spring spine 3 preferably permits the tensioner 10 to "close" as belt length increases. That is, the spring spine 3 dynamically adjusts the selected distance between the contact elements 1 to maintain the desired tension responsive to changes in the tension of the belt 11. Thus, the tensioner 10 having a spring spine may reduce the range of change in belt tension over time.

As shown in FIGS. 3-8, the spring spine 3 may be sized and shaped to accommodate limitations of the system, such as space, in which the drive mechanism is to be implemented. The spring spine 3 may be capable of being sprung open so it can be placed over an assembled belt mechanism such that the spine 3 is disposed adjacent to one side of the belt 11 perpendicular to a path along which the belt 11 travels.

An unconstrained tensioner as disclosed herein requires only that the length of the belt 11 be sufficiently long enough to allow the tensioner 10 to squeeze the belt 11 together so that the "waist" formed between the contact elements 1 of the tensioner 10 is narrower than the smaller drive pulley/gear diameter. Configured in this fashion, the tensioner 10 remains in place without being mounted to a structural member of the system in which the drive mechanism is implemented. The upper and lower spans of a belt or flexible drive member looped over pulleys travel in opposite directions. Friction at the interfaces between the belt and the contact elements 1 aids the tensioner 10 of FIGS. 1-3 to reduce or eliminate any slack in the belt. The amount of friction can be influenced by the material and/or geometry used for the tensioner 10 and/or the belt 11. For example, in some applications, a wire form tensioner 10 having a substantially circular cross-section as shown in FIG. 2 may be adequate depending on, for example, speed, duty cycle, or materials. However, in other applications, it may be preferable to further reduce the friction at the interfaces between the belt 11 and the tensioner 10. Thus, in some embodiments, the tensioner 10 preferably may be constructed using lubricious plastic.

Figure 4:
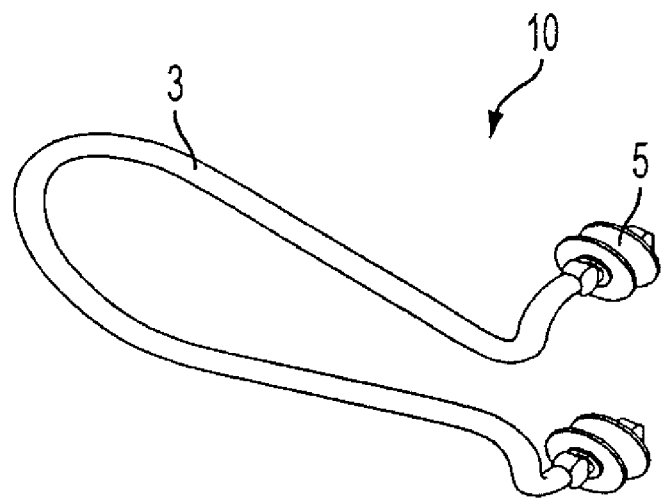
FIG. 4 shows another embodiment of a tensioner having wheels.
Figure 5:
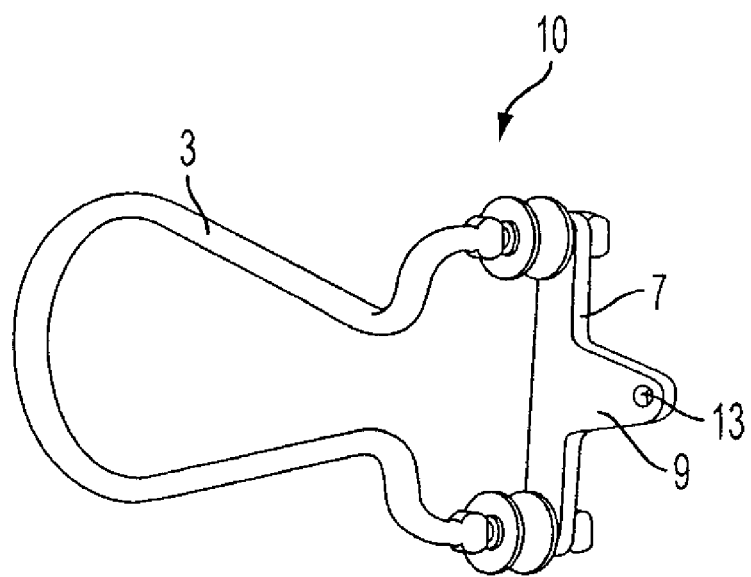
FIG. 5 shows another embodiment of a tensioner having a coupling plate and a tab.
Figure 6:
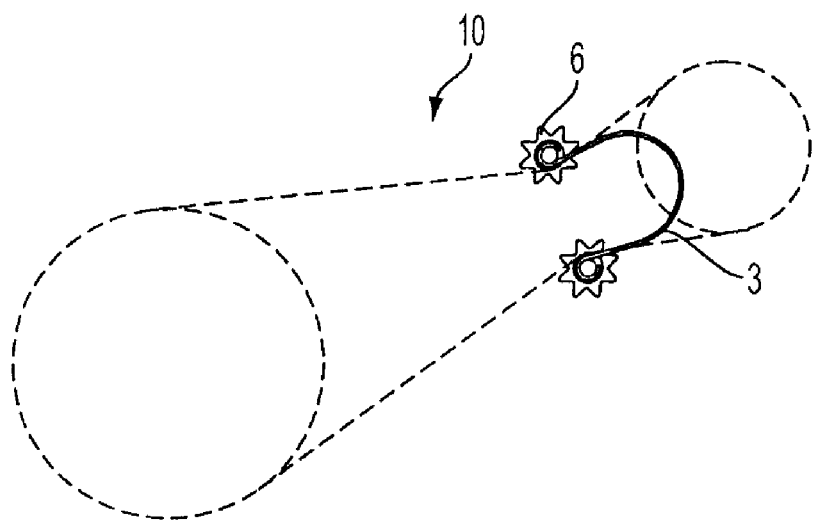
FIG. 6 illustrates a tensioner having sprockets that may be implemented with a chain drive.
Figure 7:
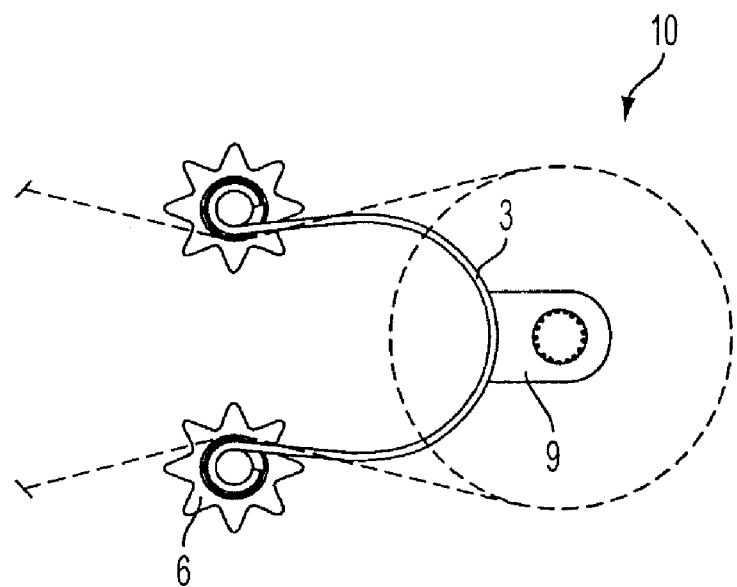
FIG. 7 illustrates the tensioner of FIG. 6 comprising a spine tab.
Figure 8:
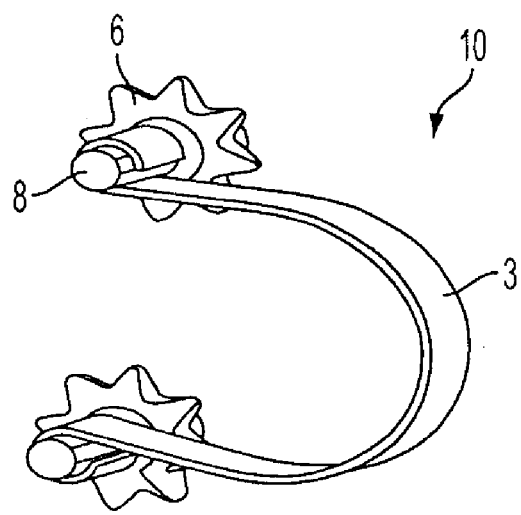
FIG. 8 shows one embodiment of tensioner having sprockets.

The tensioner may further comprise additional elements to expand its suitability to a much wider range of applications. For example, wear inserts or rollers may be added to the tensioner as application demands increase. Referring now to FIG. 4, the tensioner 10 may comprise two "wheels" 5 configured to complement the flexible drive member 11. The wheels 5 may include, for example, flat face pulleys for a flat belt (FIGS. 4-5) that may or may not include flanges at one or both sides of the wheel 5 or sprockets 6 for a chain drive (FIGS. 6-8). The wheels may be connected to the spine 3 in any number of ways. For example, the wheels 5 may include rollers adapted to slide over or snap onto bends in the spine 3. In another example, as shown in FIG. 8, the wheels 5 may be mounted onto the spine 3 with pins 8 that act as axles.

Referring back to FIG. 5, a coupling plate 7 may be attached to the tensioner 10 to maintain an established belt tension, engage the tensioner 10 more securely to the belt, and/or accommodate greater speed. In one embodiment, the coupling plate 7 can be snapped over wheel pins (not shown) along one side of the belt 11 and opposite of the spine 3. In another embodiment, adjustable lock plates may be used to secure the tensioner 10 after the tensioner 10 is affixed to the belt 11 to maintain fixed preload tensions.

In some applications, it may be desirable to maintain a position of the tensioner 10 on the belt 11. Still referring to FIG. 5, the tensioner 10 may further comprise a tab 9 to maintain the position of the tensioner 10 by snapping in place, wedging, or otherwise constraining the tensioner 10. A hole 13 may further be bored into the tab 9 and the hole 13 may then be fitted over the head of a screw, pin, or other molded-in feature to influence the position of the tensioner 10 without requiring the tensioner 10 to be bolted or clamped to a component of the structure in which the drive mechanism is implemented. In FIG. 5, the tab 9 is shown to be integral to the coupling plate 7. In other embodiments, the tab 9 may also be integral to the spine 3 (FIG. 7) or other element of the tensioner 10. To constrain the tensioner 10 in place, the tab 9 may then be coupled, for example, to one of the pulleys of the drive mechanism, a shaft upon which a pulley is mounted, or even the belt itself. Although the tensioner 10 may provide tension to a flexible drive member in a drive mechanism without mounting the tensioner 10 to a component of the structure of the system in which the drive mechanism is implemented, the tensioner 10 may also be attached to the structure if so desired.

The configuration of the belt tensioner 10 may be varied according to orientation of the drive system, drive pulley spacing, speed, belt tension force, accommodation of localized friction of the flexible drive member, and materials used. The simpler tensioner configurations shown in FIGS. 1-8 may be preferred in applications having slower drives, wider belts, closer pulley spacing, minimal drive element tension requirements, and horizontal orientation of the drive pulley/gear axle. The tensioner in FIGS. 1-8 may also be ideal in low torque timing belt applications.

Figure 9:
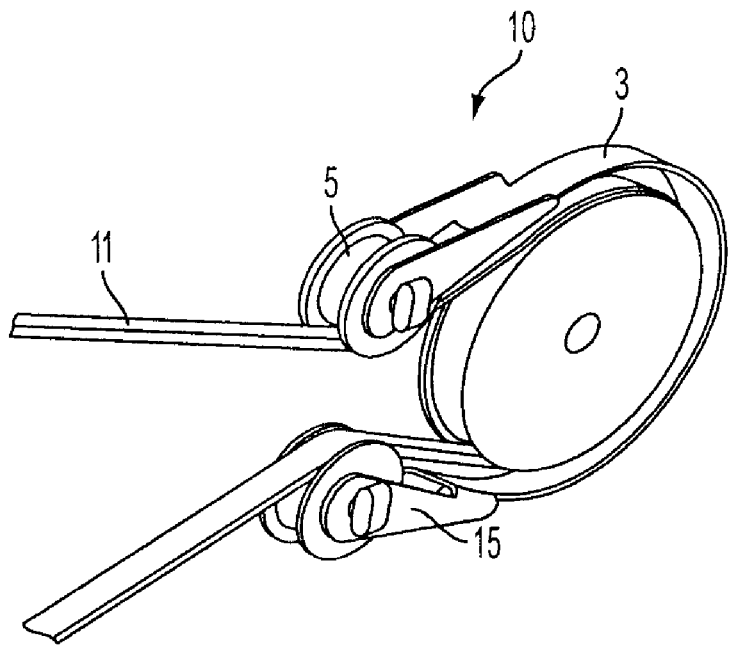
FIG. 9 shows one embodiment of a tensioner having a resilient spine disposed concentric to a pulley connected to a belt.
Figure 10:
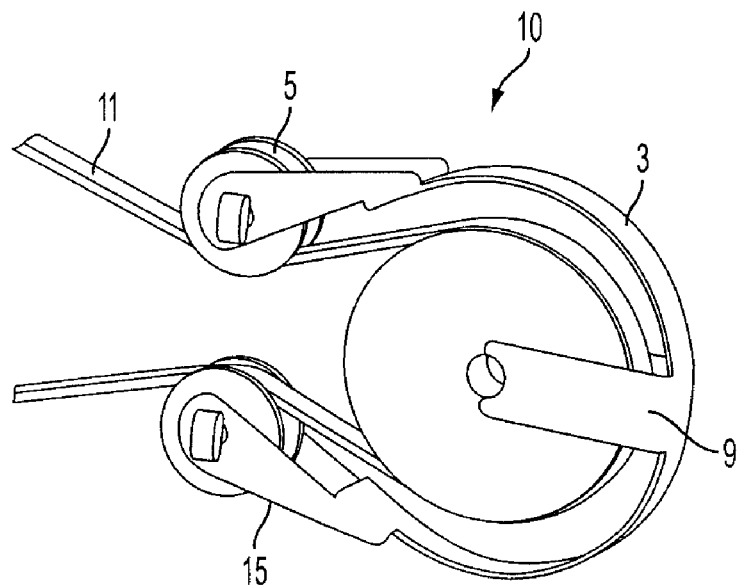
FIG. 10 shows the tensioner of FIG. 9 comprising a spine tab supported by the pulley shaft.
Figure 11:
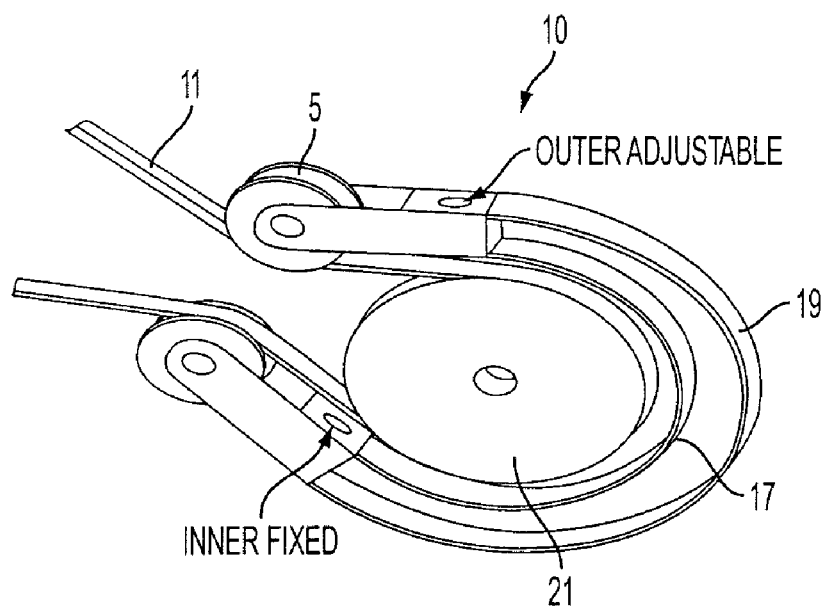
FIG. 11 shows one embodiment of a tensioner having inner and outer bands disposed concentric to a pulley connected to a belt.

Various additional configurations are further encompassed by the belt tensioner without structural mounting. Referring now to FIGS. 9-11, the tensioner 10 may be configured with wheels 5 to engage the belt 11. The resilient spine 3 may be connected to the wheels 5 via a forked connector 15. The resilient spine 3 may be configured to wrap around a pulley area rather than having the resilient spine 3 disposed along one side of the belt 11 perpendicular to a path along which the belt 11 travels. The concentric arrangements shown in FIGS. 9-11 permit a much greater level of control over perpendicularity of wider belts and the wider wheels engaging them. In FIG. 10, the tensioner 10 may also include a spine tab 9 that may be configured to be supported by the pulley drive shaft. In other embodiments, the spine tab 9 may be supported by a pulley step, boss, or other feature of the pulley. In yet other embodiments, coupling or adjustable lock plates may also be used.

Referring now to FIG. 11, in another embodiment of the tensioner 10, the spine comprises inner 17 and outer 19 bands disposed concentric to a pulley 21 connected to the flexible drive member 11. The inner band 17 may be configured to have a fixed length, while the outer band 19 may be configured to have an adjustable length that dynamically adjusts the position of the wheels 5 along the belt 11.

Other combinations of the described configurations of the tensioner 10 are also contemplated. For example, rigid arms having wheels may be coupled by a spring spine. The spring spine may impart the necessary preload force, and the tensioner 10 may then be locked in that condition by securing a lock tab. In another embodiment, the rigid arms may be coupled in a scissors configuration and preloaded with a coil, leaf, or other spring.

The tensioner described above may be formed of a variety of materials and may be constructed using different manufacturing techniques. For example, molded plastic forms for the spine and wheels may be adequate for low force applications. Stainless or spring steel may be used to accommodate both small, low force systems and larger or higher force preload requirements. A combination of these materials and others, such as aluminum, may be appropriate for configurations having contact elements with rigid arms. Wheels may be made of most plastics, elastomers, or metals. The spring spine may be constructed of plastic or metal in round, flat, or other form. Welding, swaging, bolting, soldering, bonding, snap fits, shrink fits, ultrasonics, and similar means of attaching or securing wheel pins, coupling or locking plates and rigid arms can be employed.

The belt tensioner disclosed herein may be used in any suitable machine, but in one embodiment, the belt tensioner may be used with belts in a paper transport subsystem in a printing system similar to that described in commonly-owned U.S. Ser. No. 11/044,042, entitled "Media Path Direction Control Device and Method of Reversing a Media Path," filed on Jan. 28, 2005, incorporated by reference herein.

Figure 12:
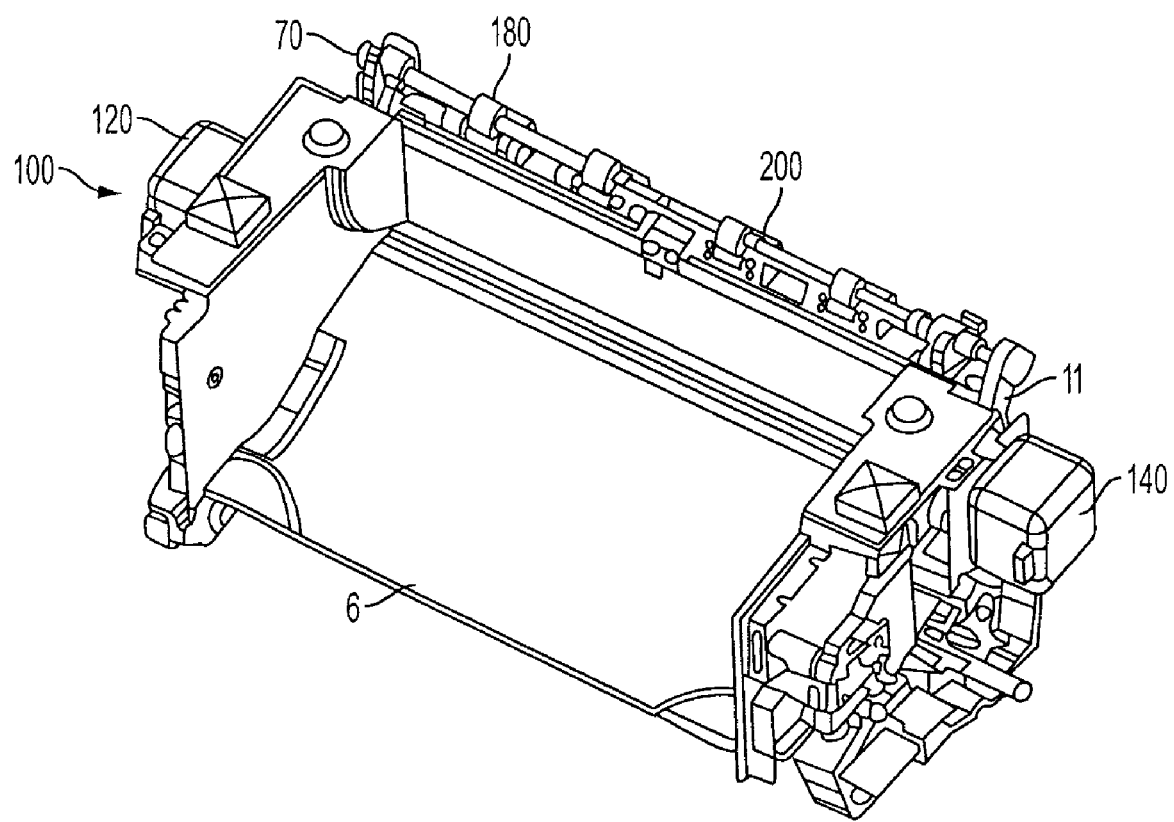
FIG. 12 shows a media path control device in a printing system in which a tensioner may be used.

FIG. 12 shows a media path control device 100 in a printing system in which the disclosed tensioner may be used. The media path control device 100 comprises two sets of parallel arms with opposing rollers to manipulate the movement of print media. The media path control device 100 includes a paper exit tray 60 which receives print media from a print engine (not shown). The media path control device 100 may include an elevator motor 120 connected to a carriage 70 via a belt (not shown) to alter a vertical position of the carriage 70 to a plurality of positions. The media path control device 100 may further include a drive motor 140 connected to the carriage 70 via a belt 11 to drive a plurality of drive rollers 180 to manipulate print media through the media path direction control device 100. The elevator motor 120 and the drive motor 140 may be reversible motors so as to reverse a direction of travel of the mechanism and print media. The carriage 70 includes a plurality of idler rollers 200 disposed at positions opposite the drive rollers 180. A nip is formed between the idler rollers 200 and the drive rollers 180 so as to capture and manipulate the movement of print media through the media path direction control device 100.

Figure 13:
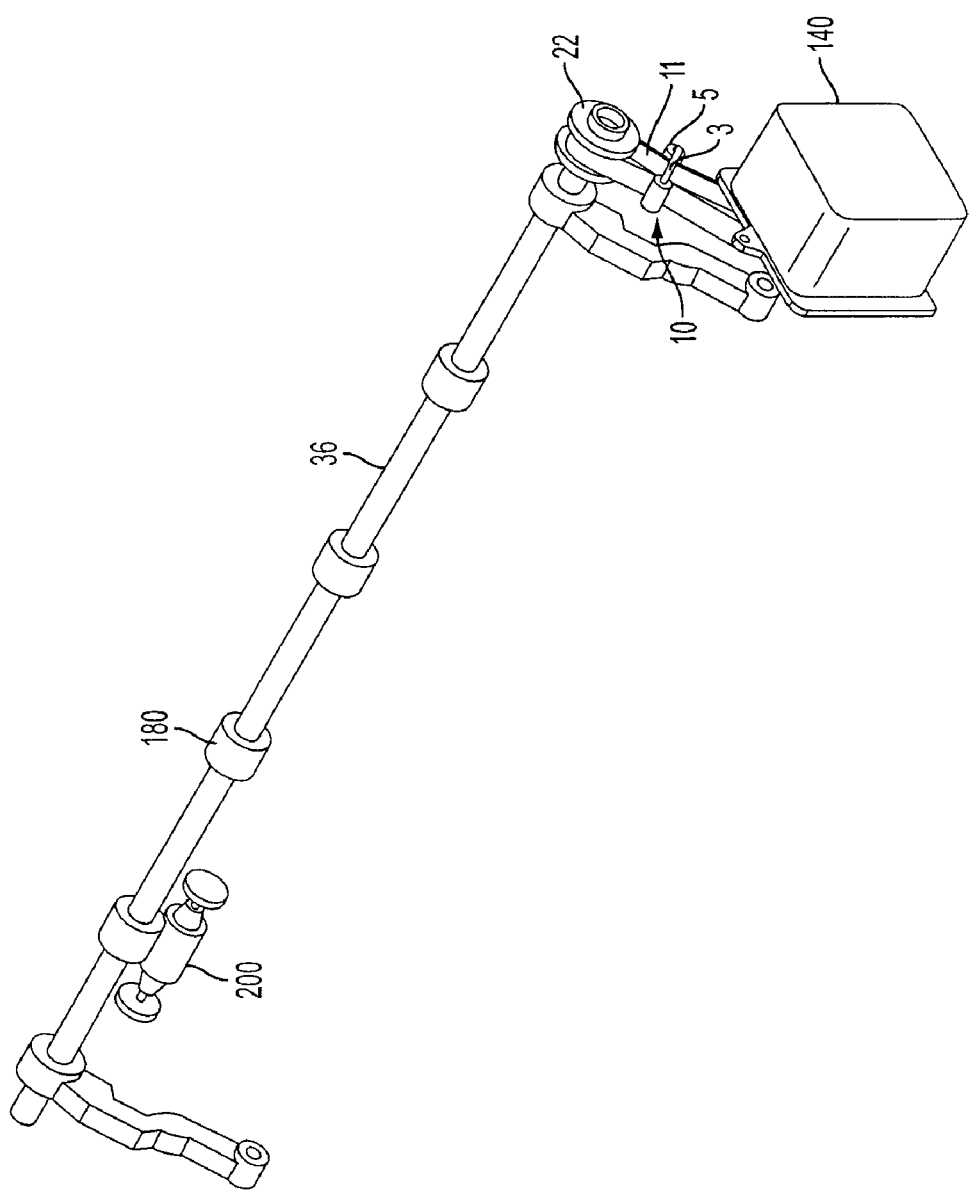
FIG. 13 illustrates one embodiment of a tensioner as implemented in the media path direction control device of FIG. 12.

FIG. 13 illustrates one embodiment of a belt tensioner 10 as implemented in the media path direction control device 100 in FIG. 12. A drive motor 140 having a first pulley (not shown) connected thereto drives a plurality of drive rollers 180 disposed on a roller shaft 36 coupled to the carriage 70 (FIG. 12). A drive force from the drive motor 140 is imparted to the drive rollers 180 via a belt 11 connected to the first pulley of the drive motor 140 and to a second pulley 22 disposed at an end of the roller shaft 36. In one embodiment, the first pulley may be fixed in position while the second pulley 22 may be movable from an initial position to a plurality of positions. The tensioner 10 comprises a pair of rigid arms connected by a spine 3 having a length selected according to a desired tension in the belt 11. The rigid arms may be configured such that the free ends of the arms are bent over the belt 11 to prevent the tensioner 10 from slipping off the belt 11. The tensioner 10 further comprises wheels 5 that may be connected to the rigid arms, for example, by sliding the wheels through the arms or by snapping the wheels over the arms. The wheels 5 have surfaces that allow the belt 11 to pass smoothly. As the second movable pulley 22 changes in position, the tensioner 10 is able to slide back and forth along the spans of the belt 11 to maintain the predetermined tension. The length of the spine 3 may also be determined according to other limitations of the print system. For example, since space is a limitation in a typical print system and drive components are built with little or no clearance from each other, the tensioner 10 may be sized and shaped to ensure that the belt 11 does not interfere with other components in the existing structure.

It will be appreciated that various of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A device for tensioning a flexible drive member, comprising:
   first and second opposing contact elements adapted to simultaneously engage upper and lower spans of the flexible drive member; and
   at least one connecting member disposed concentric to a pulley connected to the flexible drive member, the connecting member adapted to draw the first and second contact elements together and position the contact elements at a selected distance from each other to provide a predetermined tension to the flexible drive member the device free of any mounting to any component of a structure of a system in which the drive member is implemented.

2. The device of claim 1, wherein the first and second contact elements comprise rigid arms having free ends configured to bend over an edge of the flexible drive member.

3. The device of claim 1, wherein the first and second contact elements comprise a pair of wheels having surfaces that allow the flexible drive member to pass smoothly.

4. The device of claim 1, wherein the resilient spine is configured to dynamically adjust the selected distance between the first and second contact elements responsive to changes in tension of the flexible drive member.

5. The device of claim 1, wherein the resilient spine is disposed perpendicular to a path along which the flexible drive member travels.

6. The device of claim 1, further comprising:
   a coupling plate adapted to maintain the selected distance between the first and second contact elements.

7. The device of claim 1, further comprising:
   a tab adapted to constrain the tensioning device to maintain a desired position of the tensioning device along the flexible drive member.

8. A print system, comprising:
   a print substrate transport subsystem adapted to move media through the print system, comprising:
      a carriage including a plurality of idler rollers disposed at positions opposite a plurality of corresponding drive rollers to form a nip between the idler and drive rollers;

a drive motor adapted to drive the plurality of drive rollers, the drive motor connected to the carriage via a flexible drive member looped over a pair of pulleys;

a tensioning device adapted to provide tension to the flexible drive member free of any mounting to a surrounding frame of the printing system, the tensioning device comprising:

first and second contact elements adapted to simultaneously engage upper and lower spans of the flexible drive member; and a connecting member disposed concentric to a pulley connected to the flexible drive member, the connecting member adapted to draw the first and second contact elements together and position the contact elements at a selected distance from each other to provide a predetermined tension to the flexible drive member.

9. The system of claim 8, wherein the pair of pulleys comprise a first pulley connected to the drive motor and a second pulley connected to one end of the carriage, the second pulley movable from a first position to a plurality of positions.

10. The system of claim 8, wherein the first and second contact elements of the tensioning device comprise a pair of rigid arms having free ends configured to bend over an edge of the flexible drive member.

11. The system of claim 10, wherein the tensioning device further comprises wheels connected to the pair of rigid arms, the wheels having surfaces that allow the flexible drive member to pass smoothly.

12. The system of claim 10, wherein the tensioning device further comprises wheels connected to the pair of rigid arms, the wheels having surfaces that permit the tensioning device to adjust a position along the surface of the flexible drive member.

13. The system of claim 8, wherein the resilient spine is configured to dynamically adjust the selected distance between the first and second contact elements responsive to changes in tension of the flexible drive member.

14. The system of claim 8, wherein the connecting member comprises a resilient spine disposed perpendicular to a path along which the flexible drive member travels.

15. A device for tensioning a flexible drive member, comprising:

first and second opposing contact elements adapted to simultaneously engage upper and lower spans of the flexible drive member; and at least one connecting member comprising inner and outer bands disposed concentric to a pulley connected to the flexible drive member, the connecting member adapted to draw the first and second contact elements together and position the contact elements at a selected distance from each other to provide a predetermined tension to the flexible drive member without the the device being free of any mounting to a surrounding frame of a system in which the drive member is implemented.

16. The device of claim 15, wherein the first and second contact elements comprise rigid arms having free ends configured to bend over an edge of the flexible drive member.

17. The device of claim 15, wherein the first and second contact elements comprise a pair of wheels having surfaces that allow the flexible drive member to pass smoothly.

18. The device of claim 15, wherein the inner band is configured to have a fixed length and the outer band is configured to have an adjustable length to dynamically adjust a position of the first and second contact elements along the flexible drive member.

19. The device of claim 15, further comprising:

a coupling plate adapted to maintain the selected distance between the first and second contact elements.

* * * * *